Sept. 30, 1952     A. S. KROTZ     2,612,418
MOUNTING FOR ROTATING BODIES
Filed April 1, 1947
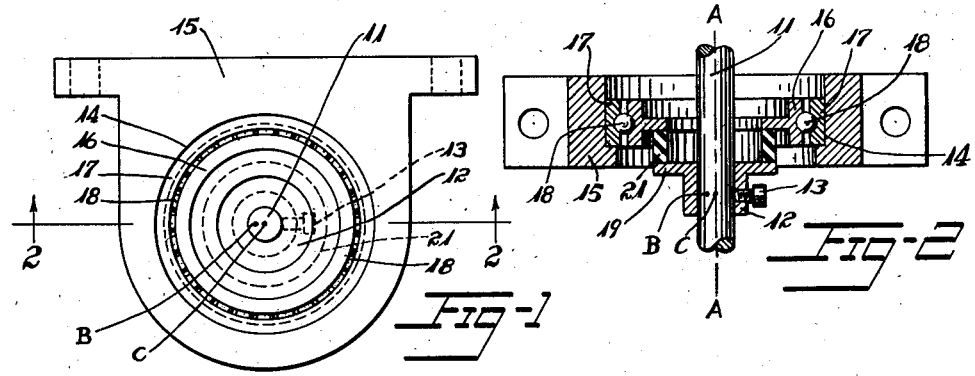
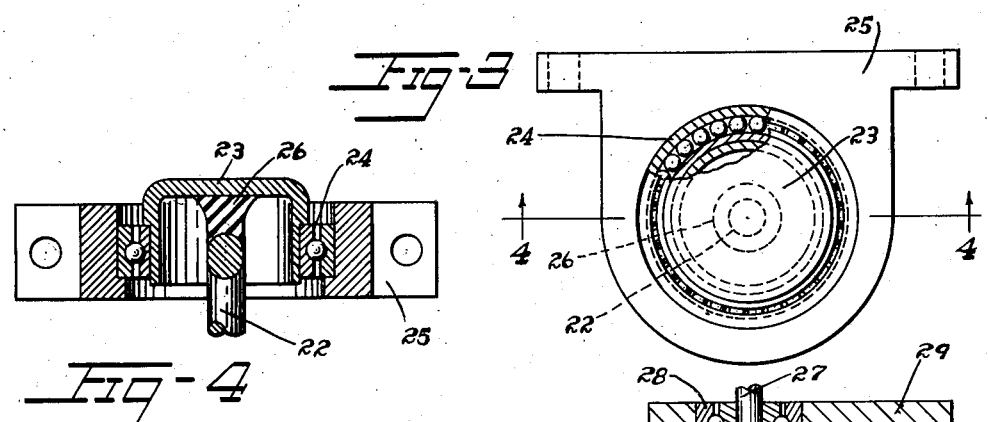
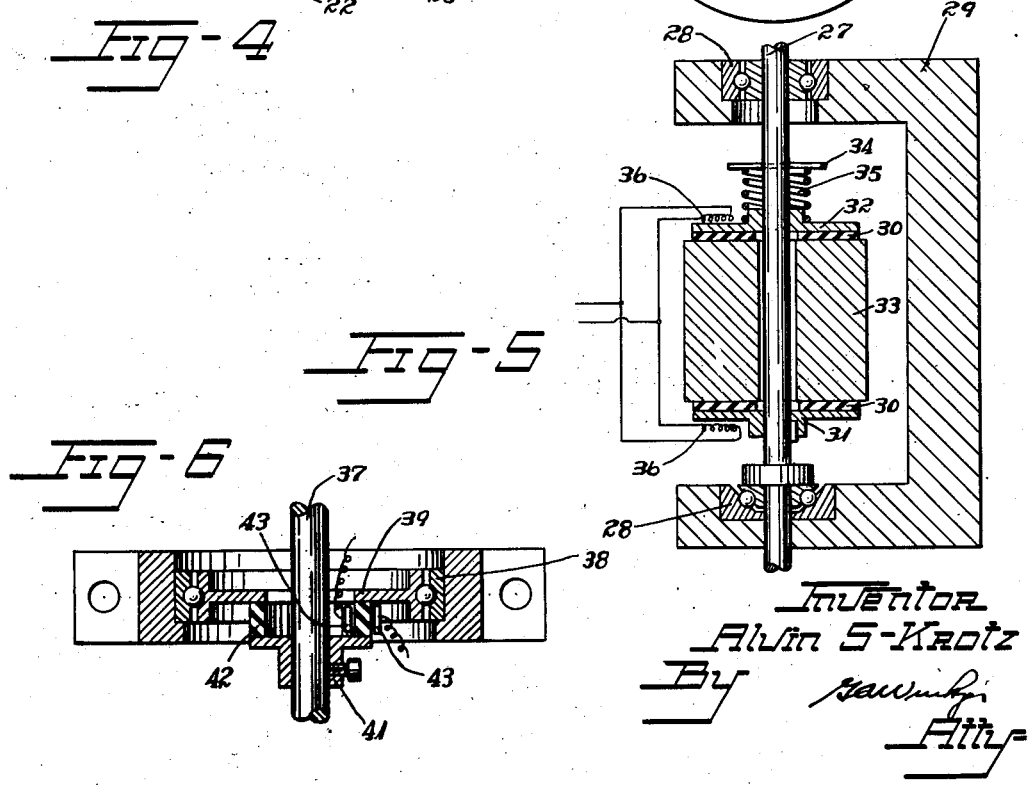
Inventor
Alvin S. Krotz
By
Atty.

Patented Sept. 30, 1952

2,612,418

UNITED STATES PATENT OFFICE 2,612,418

MOUNTING FOR ROTATING BODIES

Alvin S. Krotz, Akron, Ohio, assignor to The B. F. Goodrich Company, New York, N. Y., a corporation of New York Application April 1, 1947, Serial No. 738,662

4 Claims. (Cl. 308—184)

This invention relates to mountings for rotating bodies and to the balancing of bodies rotating above the critical speed of rotation.

Running balance of a rotating body may be had if the center of gravity of the body is at the axis of rotation. If the center of gravity is not at the axis of rotation, centrifugal force will be exerted upon the body which will tend to further displace the center of gravity radially outward from the axis of rotation. With a stiff mounting the centrifugal force may cause undesirable vibration.

Heretofore resilient mountings placed between the bearings and the supporting structure to cushion the vibration forces have been subject to the objection that in that position the mounting does one cycle of work on each revolution of the rotating body as the force rotates with the rotating body. At high speeds of rotation the service life of the resilient mounting will be shortened when the mounting is repeatedly stressed many times a minute. The resilient mounting in the position between the bearing and the supporting structure has also been undesirable in installations in which relative radial yielding movements of the bearings with respect to the supporting structure have been objectionable because of lubrication requirements or other restrictions.

When the body is rotated above a certain speed known as the critical speed of rotation, the center of gravity of the body will tend to move to a position on the axis of rotation, and the body will rotate about the center of gravity. Under this phenomenon the body will be automatically balanced and rotate with a minimum of vibration at speeds above the critical speed of rotation and it is desirable to attain the same balanced condition of rotation at speeds below the critical speed.

Efforts heretofore to set the center of gravity on the axis of rotation have usually necessitated the weighing of the body and calculation of the necessary adjustments.

Objects of the invention are to provide an improved resilient mounting for a rotating body, to provide for automatic balancing of a rotating body by employing the critical speed of rotation phenomenon, to provide for effective balancing in operation both above and below the critical speed, to provide long service life of the mounting, to provide for a minimum of vibration and noise of the rotating body, to provide for ease of assembly and balancing and to provide for a minimum of maintenance.

These and other objects will be apparent from the following description, reference being had to the accompanying drawings in which:

Fig. 1 is a plan view of a shaft mounting constructed in accordance with and embodying the invention.

Fig. 2 is a section of a mounting taken along line 2—2 of Fig. 1.

Fig. 3 is a plan view of a modified construction, parts being broken away.

Fig. 4 is a section of the mounting taken along line 4—4 in Fig. 3.

Fig. 5 is a plan view of a further modified construction.

Fig. 6 is a vertical section showing a still further modified construction.

A mounting for a rotating body embodying the invention is illustrated in Figs. 1 and 2. A rotating body such as shaft 11 is disposed in a collar 12 which may be secured to the shaft by a set screw 13 or by other suitable fastener means. A bearing 14 is disposed about the shaft 11 and is mounted in a supporting structure such as bracket 15. The bearing 14 may be of the anti-friction type and have an inner member 16, a journal or outer member 17 and intervening balls 18, 18 which are free to roll in the races of the inner and outer members. The collar 12 has a radial outwardly extending flange 19 which radially overlaps a radial inwardly extending flange of the inner member 16 of the bearing 14. A body of yieldable material 21 which may be composed of resilient rubber or other rubber-like material is interposed between and mounted on the flanges of the inner member 16 and the collar 12 for cushioning radial movement of the shaft 11 relative to the bearing 14 in shear stress of the yieldable body. As shown in the drawings the shaft 11 is mounted in a substantially vertical position and the weight of the shaft is supported and cushioned in the axial direction by the body of yieldable material 21.

The shaft 11 when at rest will assume a position as shown in Figs. 1 and 2. The dot-dash line A, A shown in Fig. 2 represents the axis of rotation of the shaft 11 and appurtenances thereto which turn in the bearing 14. If the center of gravity of the shaft 11 and appurtenances thereto is at the axis of rotation A, A, rotating balance will be attained. In most installations, however, the center of gravity will be offset from the axis of rotation in a position such as for example is indicated by the letter B in Figs. 1 and 2. As the shaft is rotated, centrifugal force will be exerted upon the shaft 11 tending to urge the axis of shaft 11 toward the center gravity. This force will move the shaft 11 in collar 12 to the left relative to the bearing 14 as seen in Figs. 1 and 2, which will stress the body of yieldable material 21 in shear. The force will rotate with the shaft 11 and with the body of yieldable material 21 and will be exerted upon the shaft 11 in substantially the same direction relative to the body of yieldable material, and will stress the body of yieldable material an amount in proportion to the speed of rotation. The center of gravity B will continue to rotate about the axis of rotation A, A with the accompanying centrifugal force acting upon the shaft 11 until the critical speed of rotation of the shaft is reached.

At speeds above the critical speed of rotation the center of gravity will shift and take a position at C as shown in Figs. 1 and 2 which is at the axis of rotation A, A. In moving the center of gravity from B to C the body of yieldable material 14 will be stressed in shear by the relative movement of the collar 12 with respect to inner member 16.

A shaft 22 in the embodiment illustrated in Figs. 3 and 4 has an end portion disposed in an annular cap member 23 which is mounted in a bearing 24 which may be of the anti-friction ball bearing type. The bearing 24 is mounted in a supporting structure such as bracket 25. A body of yieldable material 26 is disposed axially of the shaft 25 and interposed between and mounted on the end portion of the shaft 22 and the cap member 23 for cushioning radial movement of the shaft 22 relative to the cap member 23 in shear stress of the body of yieldable material. As shown in Fig. 4 the shaft 22 is disposed in a substantially vertical position and is supported and cushioned through stressing of the body of yieldable material 26 in the vertical direction, chiefly in tention.

Upon rotation of the shaft 22 and the bearing 24 the shaft and body of yieldable material will remain in the same relative position as illustrated in Figs. 3 and 4 providing the center of gravity of the shaft and appurtenances thereto is at the axis of rotation of the shaft 22. When the center of gravity is disposed at any other position, the axis of the rotating shaft 22 will be urged toward the center of gravity and the body of yieldable material 26 will be stressed in shear. As the rotation continues the stress upon the body of yieldable material 26 will increase and decrease with the speed of rotation but will not fluctuate at each revolution of the shaft 22.

At speeds above the critical speed of rotation the shaft 22 will shift to rotate about an axis through the center of gravity. If the center of gravity is not coincident with the axis of rotation at lesser speeds, the body of yieldable material 26 may be stressed in shear to permit displacement of the center of gravity to the axis of rotation at the critical speed.

After the initial displacement of the center of gravity at the critical speed takes place, there will be no further yielding because the body of yieldable material 26 rotates with the shaft 22.

If desired, the yieldable material may be of a nature to take on a set after the rotating part has found its adjusted position under high speed rotation so that the rotating part will be held to its new position even when rotation ceases. By way of example, a shaft 27 which may be the drive shaft of a small motor is shown in the embodiment of Fig. 5. The shaft 27 is mounted rotatably in bearings 28, 28 in a supporting structure such as a motor housing 29. The shaft 27 may have a flanged collar 31 fixed thereto and another flanged collar 32 relatively movable axially of the shaft 27. A rotatable body such as rotor 33 is disposed between the flanged collars 31 and 32 and about the shaft 27. A bonding material such as solder 30, or other thermoplastic material capable of being softened under heat is interposed between the flanges 31 and 32 and the rotor 33. A coil spring 35 may be disposed between a pin 34 mounted in the shaft 27 and the movable flanged collar 32 to exert sufficient compression upon the collar 32 to maintain the position of the rotor relative to the flanges 31 and 32 upon rotation of the shaft 27. Heating elements such as electric resistance coils 36, 36 are provided for heating the solder 30 and are disposed in the proximity of the solder.

The rotor 33 may be balanced on the shaft 27 by rotating the shaft and rotor at a speed greater than the critical speed of rotation, when the center of gravity of the rotor will move to the axis of rotation and the rotor will be balanced on the shaft 27. The rotor may be fixed at the balanced position by heating and cooling the solder 30 to form a bond between the flanges 31 and 32 and the rotor 33. Heat may be applied by actuating heating coils 36, 36 or by other suitable means. After this operation the rotor will be balanced upon the shaft 27 at all speeds. As shown in Fig. 5 the shaft 27 is disposed in a vtrtical position during balancing and may be used in any position after the solder 30 has cooled and the balancing is completed.

The balancing may also be accomplished by bonding the flanges 31 and 32 to the rotor 33 before the rotor is rotated and then breaking and remaking the bond at speeds above the critical speed. The spring 35 and pin 34 as well as the heating elements may be removed after the rotor has been balanced.

The mounting shown in the embodiment of Fig. 6 may be used in balancing a shaft 37 which may be rotatably mounted in a bearing 38. The journalled portion of the bearing 38 has a radially inwardly extending flange 39 which overlaps a flanged collar 41 mounted on the shaft 37. A body of thermoplastic material 42 may be interposed between and mounted on the collar 41 and flange 39. Heating electrode elements 43, 43 are disposed adjacent the body of thermoplastic material 42 for heating the body and may heat by applying a high frequency electrical voltage to the electrode elements 43, 43.

In balancing the shaft 37 the heat is applied to the body of thermoplastic material 42 after the shaft 37 is rotated above the critical speed of rotation. By heating and then cooling the body of thermoplastic material the shaft 37 may be fixed at the balanced position as the material will yield when heated and allow the shaft 37 to adjust itself relative to the bearing 38 and will stiffen when cooled to maintain the balanced condition.

As shown in Fig. 6 the shaft 37 is disposed in a substantially vertical position during the balancing so that substantially the only force to which the shaft is subjected in the radial direction at the balancing speed is the force tending to balance the shaft. After the thermoplastic material 42 has cooled at the balanced position the shaft may be operated in other positions and will maintain its balance at these positions.

Variations may be made without departing

I claim:

1. The combination with a body rotatable about an axis, of a stationary supporting structure, a bearing non-resiliently mounted in said supporting structure and entirely spaced from the rotatable body, an intervening cushioning body of resilient rubber material having portions secured to a portion of said bearing and to a portion of said rotatable body axially spaced-apart from said portion of said bearing, and said cushioning body in radial planes thereof being free and spaced-apart from said bearing and rotatable body providing a space around said cushioning body for free radial movement of said cushioning body in said planes to stress said cushioning body substantially completely in shear upon relative radial movement of said bearing and said rotatable body.

2. The combination with a body rotatable about an axis, of a stationary supporting structure, an annular bearing non-resiliently mounted in said supporting structure and around the rotatable body at a spaced-apart position therefrom, an annular body of resilient rubber material disposed around said rotatable body and having portions at the ends secured to a portion of said bearing and to a portion of said rotatable body axially spaced from said bearing, said cushioning body in radial planes thereof being free and spaced-apart from said bearing and rotatable body providing spaces at the faces of said cushioning body for free radial movement of said cushioning body in said planes to stress said cushioning body substantially completely in shear upon relative radial movement of said bearing and said rotatable body.

3. The combination with a body rotatable about an axis, of a stationary supporting structure, a bearing non-resiliently mounted in said supporting structure and entirely spaced from the rotatable body, a portion of said bearing radially overlapping a portion of said rotatable body, an intervening cushioning body of resilient rubber material extending axially between the portions of said bearing and said rotatable body, said cushioning body having end portions secured to the portions of said bearing and said rotatable body, and said cushioning body in radial planes thereof being free and spaced-apart from said bearing and said rotatable body providing free axially extending faces of said cushioning body for free radial movement of said cushioning body in said planes to stress said cushioning body substantially completely in shear upon relative radial movement of said bearing and said rotatable body.

4. The combination with a body rotatable about an axis, of a stationary supporting structure, an annular bearing non-resiliently mounted in said supporting structure about said axis, a portion of said bearing extending in the radial direction across said bearing and through said axis, an end portion of the rotatable body disposed at a position spaced from said portion of the bearing, an intervening cushioning body of resilient rubber material extending along said axis from said end portion of the rotatable body to said portion of said bearing, said cushioning body having portions secured to said end portion of said rotatable body and to said portion of the bearing, and said cushioning body in radial planes thereof being free and spaced-apart from said cushioning body providing a space around said cushioning body for free radial movement of said cushioning body in said planes to stress said cushioning body substantially completely in shear upon relative radial movement of said bearing and said rotatable body.

ALVIN S. KROTZ.

REFERENCES CITED

The following references are of record in the file of this patent:

UNITED STATES PATENTS

| Number | Name | Date |
|---|---|---|
| 1,362,712 | McChesney | Dec. 21, 1920 |
| 1,908,743 | Farrell | May 16, 1933 |
| 2,040,352 | Williams | May 12, 1936 |
| 2,201,477 | Chamberlain | May 21, 1940 |
| 2,285,404 | Best | June 9, 1942 |
| 2,295,316 | Yates | Sept. 8, 1942 |
| 2,414,335 | Schroeder | Jan. 14, 1947 |

FOREIGN PATENTS

| Number | Country | Date |
|---|---|---|
| 29,441 | Sweden | Sept. 3, 1910 |
| 140,487 | Switzerland | Aug. 16, 1930 |
| 704,440 | France | May 20, 1930 |